Feb. 4, 1941.  E. A. STRATTMAN  2,230,767
FOOTBALL GAME
Filed March 25, 1940
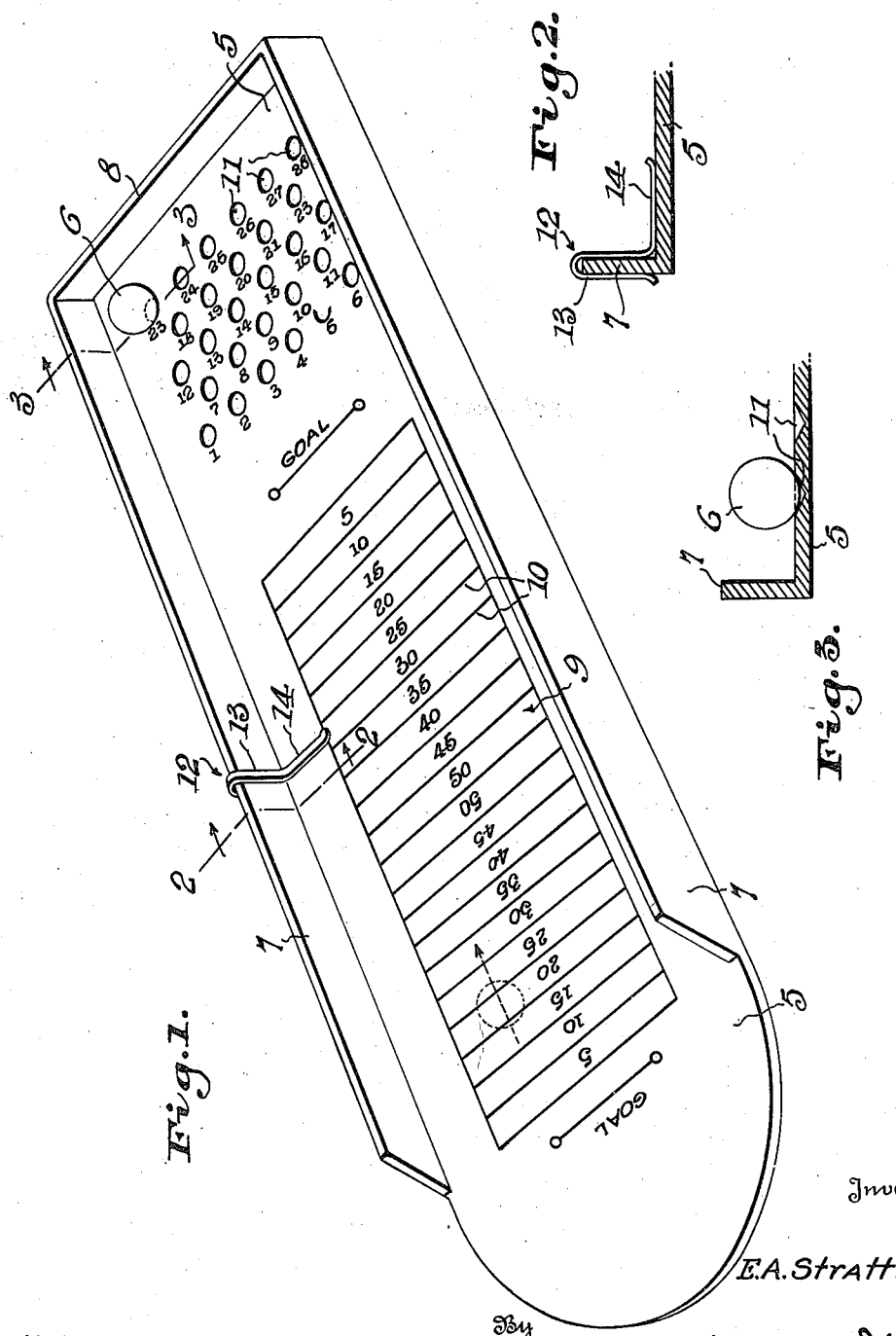
Inventor
E. A. Strattman
By H. B. Wilson & Co.
Attorneys
WITNESS
H. Woodard Patented Feb. 4, 1941

2,230,767

UNITED STATES PATENT OFFICE 2,230,767

FOOTBALL GAME

Edwin A. Strattman, Bogalusa, La., assignor of one-fourth to Laney R. Mills, Bogalusa, La.

Application March 25, 1940, Serial No. 325,853

1 Claim. (Cl. 273—94)

The invention aims to provide a simple and inexpensive, yet a very entertaining game of football in which each player has the same chances of success or failure as in a real football game.

With the foregoing in view, the invention resides in the novel subject matter hereinafter described and claimed, description being accomplished by reference to the accompanying drawing.

Figure 1 is a perspective view.

Figures 2 and 3 are vertical transverse sectional views on lines 2—2 and 3—3 of Fig. 1.

A preferred construction has been illustrated and will be rather specifically described, with the understanding, however, that within the scope of the invention as claimed, minor variations may be made.

The numeral 5 on the drawing denotes a horizontally elongated board upon which to roll a marble or other ball 6, said board having longitudinal side walls 7 and at least one end wall 8 to confine the ball 6. The greater part of the length of the board 5 is occupied by a representation of a football field as denoted at 9, said representation having transverse lines 10 representing the 5, 10, 15, 20, 25, 30, 35, 40, 45 and 50 yard lines of each player or team. The foot end of the board 5 is also provided with a plurality of pockets 11 into which the players endeavor to roll the ball or marble 6. There are preferably twenty-eight of these pockets and they are provided with numbers or the like for use in determining how much the mythical football is advanced or moved back at the end of each play. In order to make use of the indicating numbers or the like of the pockets 11 to determine the point at which to place the mythical ball, I preferably provide in the rules of playing the game, a scoring sheet which may well be as follows:

Scoring sheet

| Running plays | Passing plays |
|---|---|
| 1. No gain | 1. Incomplete |
| 2. 2 yard gain | 2. 5 yard gain |
| 3. 5 yard penalty | 3. 5 yard loss |
| 4. 5 yard gain | 4. 5 yard gain |
| 5. No gain | 5. Intercepted |
| 6. 3 yard gain | 6. 5 yard gain |
| 7. 5 yard penalty | 7. Incomplete |
| 8. 4 yard gain | 8. 8 yard gain |
| 9. Fumble, lost ball | 9. Intercepted |
| 10. 8 yard gain | 10. 10 yard gain |
| 11. 8 yard loss | 11. Fumble, lost ball |
| 12. 6 yard gain | 12. 12 yard gain |
| 13. Fumble, lost ball | 13. Intercepted for 10 yard gain |
| 14. 15 yard gain | 14. 14 yard gain |
| 15. 5 yard gain | 15. 15 yard penalty |
| 16. 5 yard penalty | 16. 25 yard gain |
| 17. 15 yard penalty | 17. Intercepted for 20 yard gain |
| 18. 12 yard gain | 18. 25 yard gain |
| 19. No gain | 19. Fumble, lost ball |
| 20. 10 yard gain | 20. Touchdown |
| 21. Fumble, lost ball | 21. Intercepted for 30 yard gain |
| 22. 16 yard gain | 22. 15 yard gain |
| 23. 15 yard loss | 23. 10 yard loss |
| 24. 20 yard gain | 24. 40 yard gain |
| 25. Fumble, lost ball | 25. Intercepted for touchdown |
| 26. 25 yard gain | 26. 20 yard gain |
| 27. Fumble, lost ball 10 yards back | 27. 10 yard loss |
| 28. 5 yard gain | 28. 10 yard gain |

| Punts | Kick off |
|---|---|
| 1. Blocked, recovered | 1. Over goal line |
| 2. 15 yards | 2. 30 yard line |
| 3. 5 yard penalty | 3. 22 yard line |
| 4. 20 yards | 4. 25 yard line |
| 5. Fumble, lost ball | 5. 35 yard line |
| 6. 15 yards allowed by penalty | 6. 15 yard line |
| 7. Returned 10 yards for scrimmage. | 7. 40 yard line. |
| 8. 35 yards | 8. 30 yard line |
| 9. 15 yards | 9. Returned to opponent's 40 yard line |
| 10. 45 yards | 10. 25 yard line |
| 11. Returned 15 yard of scrimmage. | 11. 45 yard line |
| 12. Runs and gains 30 yards | 12. 35 yard line |
| 13. Returned 25 yards of scrimmage. | 13. 40 yard line |
| 14. Runs and gains 25 yards | 14. 30 yard line |
| 15. Blocked lost ball | 15. 45 yard line |
| 16. 40 yards | 16. 25 yard line |
| 17. Returned 15 yards of scrimmage | 17. 50 yard line |
| 18. 45 yards | 18. 10 yard line |
| 19. Blocked recovered | 19. Returned to opponent's 40 yard line |
| 20. Quick kick to opponent's 5 yard line | 20. 15 yard line |
| 21. Returned for touchdown | 21. 50 yard line |
| 22. 50 yards | 22. 25 yard line |
| 23. Fumble recovered | 23. 45 yard line |
| 24. Runs and gains 25 yards | 24. 18 yard line |
| 25. Blocked ball lost | 25. Returned for touchdown |
| 26. Quick kick to opponent's 1 yard line | 26. 20 yard line |
| 27. Returned 25 yard of scrimmage | 27. Returned to opponent's 30 yard line |
| 28. 60 yards | 28. Over goal line |

A novel marker 12 is slidable along one or the other of the side walls 7 to indicate the position of the mythical football after each play. This marker is preferably formed from a single strip of metal bent to provide it with an arched portion 13 to straddle one of the side walls 7, and with an indicating finger 14 projecting horizontally inward from the inner leg of said arched portion 13, said finger 14 extending to the playing field representation 9. The marker 12 may be quickly and easily slid along the supporting side wall or if desired, could be removed and replaced when its position is to be changed. It is preferable that the two legs of the arched portion 13 be so related as to yieldably grip the side wall and thus hold the marker against accidental slipping.

The game is preferably governed by regular football rules and may well have every play of the regular game, subject to the call of the player. It is played by two or more players, each player taking his turn at rolling the ball or marble 6 into the pockets 11. These pockets are numbered to correspond with the numbers on the scoring sheet which gives the result of each play. The pockets with even numbers preferably act in favor of the player rolling the marble and the pockets with uneven numbers are in favor of the other player. Thus, the more skill the player uses in rolling the ball or marble, the better results he will obtain, making the game a truly scientific one.

In starting the game, each player selects his own goal as in regular football. One player then "kicks off" to the other by rolling the ball or marble 6 into one of the pockets 11, endeavoring to place the ball in the pocket which will advance the mythical football as deep in his opponent's territory as possible. Then, the position of the ball is determined by referring to the corresponding number on the scoring sheet. Thus, if the marble goes in hole 22, the marker 12 is placed on the kicker's 25 yard line, his ball, first down, and 10 yards to go in four downs or plays, each roll of the marble being considered one down. The player receiving the ball, then proceeds to advance same down the field by rolling the marble in the holes of his liking, and if in four plays or less, the ball has been advanced 10 yards or more, the marker 12 is moved to the line where the ball is played by the last play and the player has another first down, as at first. When the player fails to advance the ball 10 yards in four downs, the ball goes over to his opponent at the point where it was last played. A player with the ball may punt at any time, by calling the play before he rolls the marble or ball 6, and his opponent takes the ball subject to the scoring sheet, as shown under the heading "Punts." When the other player receives the ball on downs, by punt, or in any other manner, he then proceeds to advance the ball in the same manner as above explained. In this way, the play continues until the time of the game is over and the player having the most points is the winner.

Point after touchdown may be made by rolling the marble in a pocket with an even number.

When the ball is inside of the opponent's 30 yard line, the player may call for a field goal and make it by rolling the marble in a hole with an even number.

When yardage is lost to an extent that the ball is put behind the goal line of the player having the same, it gives a safety of two points to the player on defense.

When the marble or the like 6 is rolled, it counts as a down regardless of how far it rolls or whether it goes in a pocket or not, except on the kick-off or when the playing is punting, in which cases, the marble must go in a hole.

A player rolling or throwing the marble off the board is subject to a 15 yard penalty by opponent.

When a player fails to call his play before rolling the marble, he may be penalized 15 yards or the defensive player may decline the penalty if the roll is in his favor.

Regular football rules are preferably used in deciding all plays.

The length of the playing time is decided by the players before starting the game.

From the foregoing taken in connection with the accompanying drawing, it will be seen that novel and advantageous provision has been made for carrying out the object of the invention, and attention is again invited to the possibility of making minor variations.

I claim:

In a game representing football and including a board upon which to roll a ball in determining each new position for an imaginary football, and vertical ball retaining walls on said board; a football field simulation on said board and extending longitudinally of one of said walls, a horizontal pointer over said board and cooperable with said field simulation to show each new position of the imaginary football, and means mounting said horizontal pointer upon said one of said walls for movement longitudinally thereof, whereby said board constitutes both a rolling surface for the ball and a carrier for said field simulation, and said one of said walls constitutes both a ball-retaining means and a support for said horizontal pointer in any position to which it may be moved.

EDWIN A. STRATTMAN.